(No Model.)

W. H. H. SMITH.
STOVE LID AND PAN LIFTER.

No. 278,369. Patented May 29, 1883.

Witnesses
O. M. Shaw.
Laban Heath.

Inventor
Wm. H. H. Smith,
Per C. C. Shaw
Atty.

N. PETERS, Photo-Lithographer, Washington, D. C.

UNITED STATES PATENT OFFICE.

WILLIAM H. H. SMITH, OF SOMERVILLE, MASSACHUSETTS.

STOVE-LID AND PAN LIFTER.

SPECIFICATION forming part of Letters Patent No. 278,369, dated May 29, 1883.

Application filed February 2, 1883. (No model.)

*To all whom it may concern:*

Be it known that I, WILLIAM H. H. SMITH, of Somerville, in the county of Middlesex, State of Massachusetts, have invented a certain new and useful Improvement in Stove-Lid and Pan Lifters, of which the following is a description sufficiently full, clear, and exact to enable any person skilled in the art or science to which said invention appertains to make and use the same, reference being had to the accompanying drawings, forming a part of this specification, in which—

Figure 1:
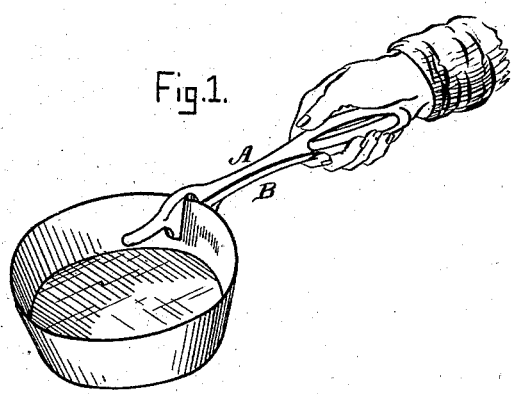
Figure 2:
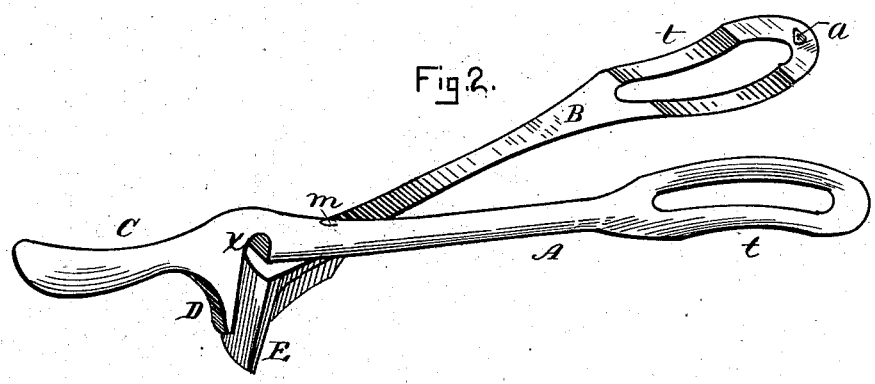

Figure 1 is an isometrical perspective view representing the implement as used for lifting a pan; Fig. 2, a like view, showing its handles opened; and Fig. 3 a vertical longitudinal section of the lift, showing its handles closed.

Like letters of reference indicate corresponding parts in the different figures of the drawings.

My invention relates to implements for lifting or manipulating stove-lids and pans; and it consists in a novel construction and arrangement of the parts, as hereinafter more fully set forth and claimed, by which a more effective device of this character is produced than is now in ordinary use.

The nature and operation of the improvement will be readily understood by all conversant with such matters from the following explanation, its extreme simplicity rendering an elaborate description unnecessary.

Figure 3:
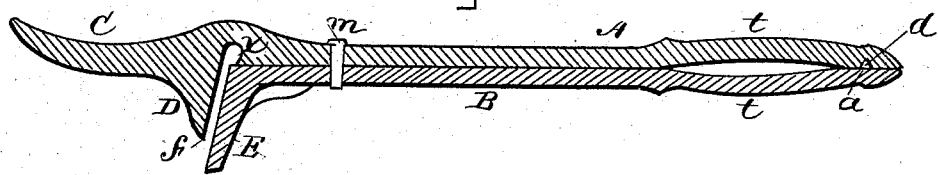

In the drawings, A B represent the handles, which are jointed or pivoted at *m*, as shown in Figs. 2 and 3. The handle A is provided with the curved projection C at its forward end, which forms the griddle-lift proper, and with a downwardly-projecting jaw, D. The handle B is provided with a jaw, E, and projection *a*, which fits a corresponding aperture or depression, *d*, in the handle A. The jaws D E do not come into close contact, and are inclined slightly, as best shown in Fig. 3, the space *f* being designed to receive the side of a pan, and the incline of the jaws corresponding with the angle at which the side of the pan stands with respect to the plane of its bottom. A curved transverse aperture, *x*, is formed in the upper jaw, at the top of the space *f*, for receiving the rim of the pan.

In the use of my improvement for lifting lids the handles A B are closed, as shown in Fig. 3, the "spring" of the handles permitting the projection *a* to fall into the depression *d* and lock the handles together. For lifting pans the handles are opened, as shown in Fig. 2, or far enough to permit the edge of the pan to pass into the space *f* and its rim into the aperture *x*, after which they are closed, as shown in Fig. 1.

The handles are curved, as shown at *t*, to enable them to be more readily separated as occasion requires, and also to render them better fitted for being held in the hand.

Having thus explained my invention, what I claim is—

A stove-lid and pan lifter consisting of the handle A, provided with the jaw D, projection C, aperture *x*, and depression *d*, and the handle B, pivoted at *m* to the handle A, and provided with the jaw E and projection *a*, constructed, combined, and arranged to operate substantially as set forth.

WM. H. H. SMITH.

Witnesses:
 C. A. SHAW,
 LABAN HEATH.